United States Patent
Swanson et al.

(10) Patent No.: US 11,268,923 B2
(45) Date of Patent: Mar. 8, 2022

(54) SENSOR FOR COMPOSITIONS WHICH DEPOSIT UPON A SURFACE FROM A GASEOUS MATRIX

(71) Applicant: MSA TECHNOLOGY, LLC, Cranberry Township, PA (US)

(72) Inventors: Meghan E. Swanson, Pittsburgh, PA (US); Daniel D. Santoro, Jr., Pittsburgh, PA (US); Michael Alvin Brown, Cranberry Township, PA (US); Mark Fiori Zanella, Sr., Chicora, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 278 days.

(21) Appl. No.: 16/437,615

(22) Filed: Jun. 11, 2019

(65) Prior Publication Data

US 2020/0393394 A1  Dec. 17, 2020

(51) Int. Cl.
*G01N 27/14*  (2006.01)
*G01N 25/02*  (2006.01)

(52) U.S. Cl.
CPC .............. *G01N 27/14* (2013.01); *G01N 25/02* (2013.01)

(58) Field of Classification Search
CPC .............................. G01N 27/14; G01N 25/02
See application file for complete search history.

(56) References Cited

U.S. PATENT DOCUMENTS

| | | |
|---|---|---|
| 4,533,520 A | 8/1985 | Bossart |
| 4,627,269 A | 12/1986 | Forster |
| 5,401,470 A | 3/1995 | Poli |
| 5,528,225 A | 6/1996 | Sakai |
| 5,599,584 A | 2/1997 | Champney, Jr. |
| 5,780,715 A | 7/1998 | Imblum |
| 6,131,438 A | 10/2000 | Zanini-Fisher |

(Continued)

FOREIGN PATENT DOCUMENTS

| | | |
|---|---|---|
| EP | 0500598 B1 | 3/1997 |
| GB | 1550615 | 8/1979 |

(Continued)

OTHER PUBLICATIONS

V. Palmisano et al. Selectivity and resistance to poisons of commercial hydrogen sensors, International Journal of Hydrogen Energy, vol. 40, No. 35, (Sep. 1, 2015), pp. 11740-11747.

(Continued)

*Primary Examiner* — David Z Huang
(74) *Attorney, Agent, or Firm* — Bartony & Associates LLC

(57) ABSTRACT

A sensor system for detecting mass deposition from a gaseous environment includes a first sensor element including a first electrically conductive heating component and a first interface structure on the first electrically conductive heating component. The sensor system further includes electronic circuitry in connection with the first electrically conductive heating component. The electronic circuitry is configured to provide energy to the first electrically conductive heating component to heat the first sensor element and (Continued)

to measure a thermodynamic response of the first sensor element, which varies with mass deposition of one or more compositions on the first interface structure.

22 Claims, 8 Drawing Sheets

(56) References Cited

U.S. PATENT DOCUMENTS

| | | |
|---|---|---|
| 6,705,152 B2 | 3/2004 | Routkevitch |
| 6,756,016 B2 | 6/2004 | Miller |
| 7,041,256 B2 | 5/2006 | Wang |
| 8,826,721 B2 | 9/2014 | Zanella, Sr. |
| 9,228,967 B2 | 1/2016 | Alepee |
| 2002/0146352 A1 | 10/2002 | Wang |
| 2003/0039299 A1 | 2/2003 | Horovitz |
| 2006/0019402 A1 | 1/2006 | Wang |
| 2006/0249384 A1* | 11/2006 | Kim .............. G01N 27/127 204/424 |
| 2008/0034841 A1 | 2/2008 | Bahs |
| 2011/0100090 A1 | 5/2011 | Zanella, Sr. |
| 2011/0110019 A1* | 5/2011 | Varade .............. H01G 11/56 361/500 |
| 2012/0318037 A1 | 12/2012 | Lee |
| 2014/0273263 A1* | 9/2014 | Zanella, Sr. .......... G01N 27/16 436/149 |
| 2017/0024992 A1 | 1/2017 | Chey |
| 2018/0128763 A1 | 5/2018 | Swanson |
| 2018/0335411 A1 | 11/2018 | Zanella, Sr |
| 2018/0335412 A1 | 11/2018 | Zanella, Sr |
| 2018/0353885 A1 | 12/2018 | Swanson |
| 2020/0025701 A1 | 1/2020 | Brown |
| 2020/0028386 A1 | 1/2020 | Sexton |

FOREIGN PATENT DOCUMENTS

| | | |
|---|---|---|
| JP | 2000039413 | 2/2000 |
| JP | 2007048578 | 2/2007 |
| JP | 2010054230 | 3/2010 |
| JP | 2012247239 | 12/2012 |
| JP | 2013509594 | 3/2013 |
| WO | WO2008157391 A1 | 12/2008 |
| WO | 2018085026 | 5/2018 |
| WO | 2018212966 | 11/2018 |
| WO | WO2018212965 | 11/2018 |
| WO | WO2020018526 A1 | 1/2020 |
| WO | WO2020023425 A1 | 1/2020 |
| WO | WO2020251925 | 12/2020 |
| WO | WO2020251931 | 12/2020 |

OTHER PUBLICATIONS

Ruffer, Daniel et al., New Digital Metal-Oxide (MOx) Sensor Platform, Sensors, vol. 18, No. 4, (Mar. 31, 2018), pp. 1-12.
Schuler, M. et al., A novel approach for detecting HMDSO poisoning of metal oxide gas sensors and improving their stability by temperature cycled operation, Journal of Sensors and Sensor Systems, vol. 4, No. 2, (Oct. 19, 2015), pp. 305-311.
Mosely, P.T. and Tofield, B.C., ed., Solid State Gas Sensors, Adams Hilger Press, Bristol, England (1987).
Firth, J.G. et al., Combustion and Flame 21, 303 (1973).
Cullis, C.F., and Firth, J.G., Eds., Detection and Measurement of Hazardous Gases, Heinemann, Exeter, 29 (1981).

* cited by examiner

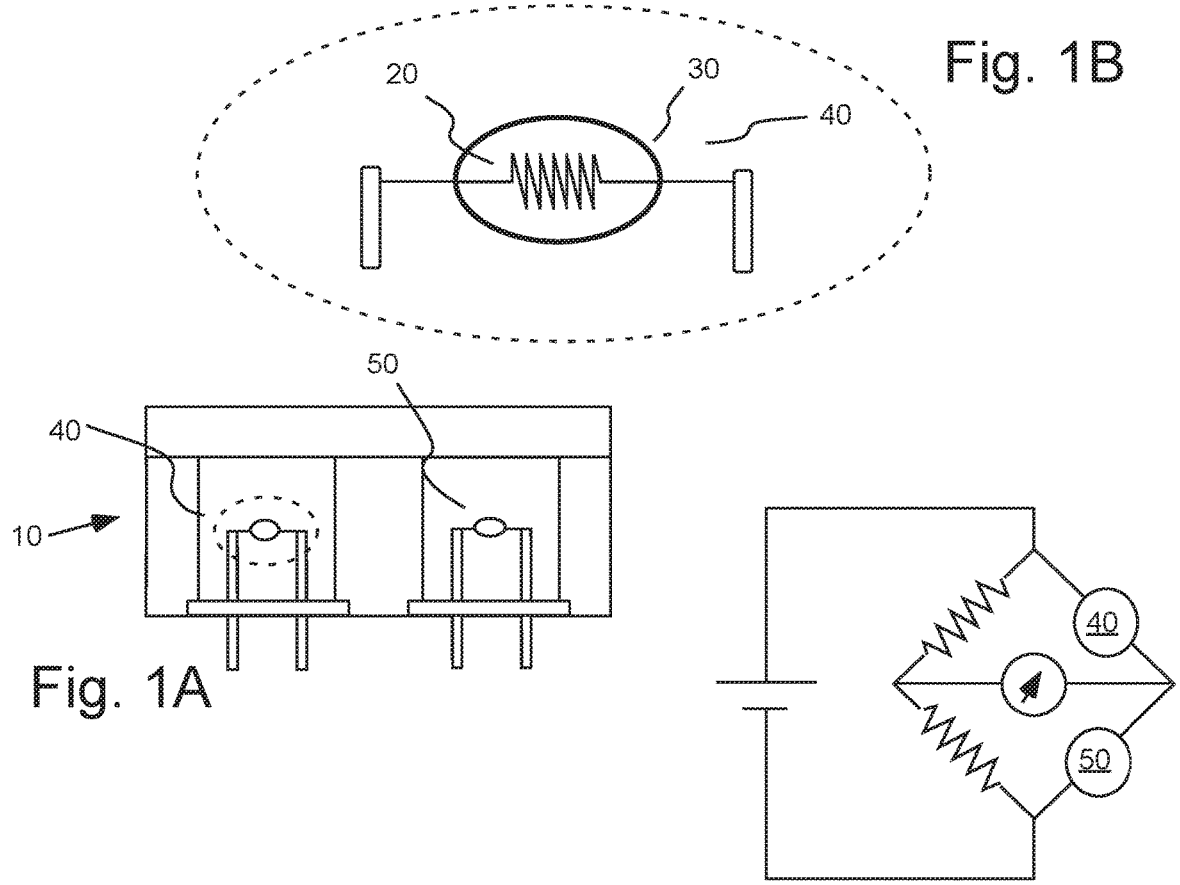
Fig. 1B
Fig. 1A
Fig. 1C
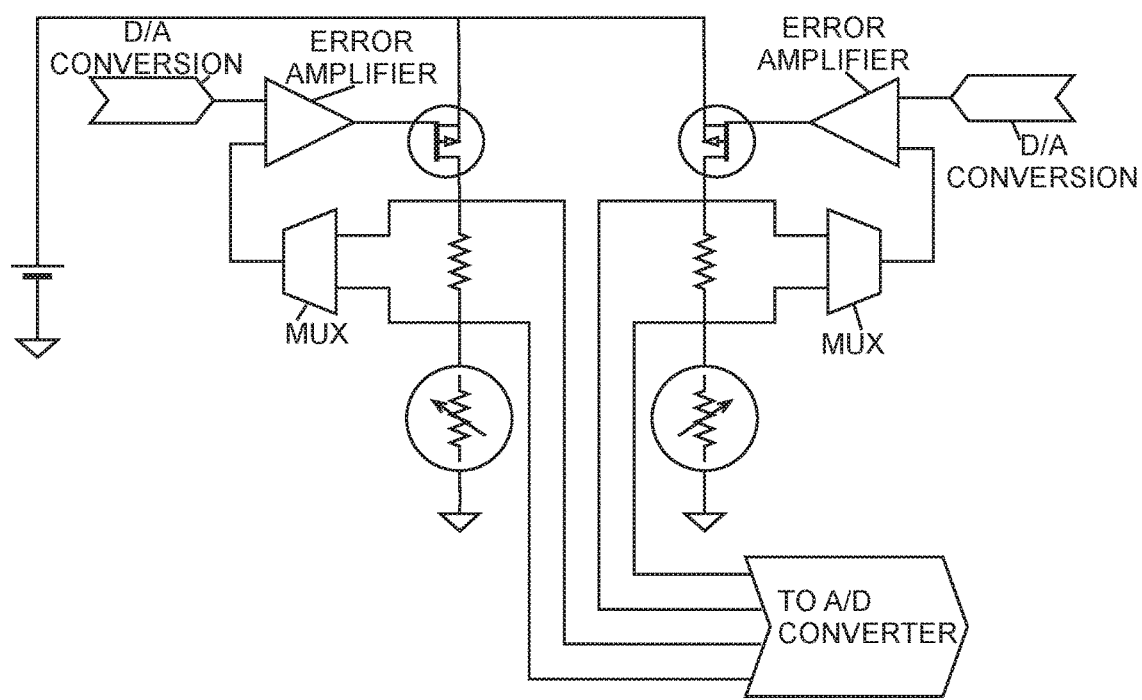
Fig. 1D

SENSOR FOR COMPOSITIONS WHICH DEPOSIT UPON A SURFACE FROM A GASEOUS MATRIX

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

In many different applications, vapor or gaseous compositions/contaminants which deposit upon surfaces from a gaseous matrix or environment present a significant problem. For example, such compositions/contaminants may deposit upon equipment components and cause malfunction or failure.

Siloxanes are, for example, commonly found in many environments and are formed from breakdown of modern silicone materials, which include silicone fluids, silicone greases, silicone rubbers, silicone resins and silicone additives used for both industrial and personal care products. Following environmental release, many siloxanes end up in wastewater and landfills.

Many silicon-containing compound such as siloxanes are considered contaminants in many processes. Digester and landfill gas, termed "biogas", includes primarily methane and carbon dioxide and can be burned for fuel in heat and power engines. Siloxanes D3 through D6 (that is, hexamethylcyclotrisiloxane, octamethylcyclotetrasiloxane, decamethylcyclopentasiloxane, and dodecamethylcyclohexasiloxane respectively) and L2 through L5 (that is, hexamethyldisiloxane, octamethyltrisiloxane, decamethyltetrasiloxane, dodecamethylpentasiloxane and tetradecamethylhexasiloxane, respectively) are commonly found in biogas, along with an array of hydrocarbons, including alkanes, alkenes, and aromatics. Device components such as engine, turbine and fuel cell components may, for example, be damaged via abrasion or blockage by the oxidation products (for example, silicon dioxide) resulting from trace amounts of low molecular weight siloxanes present in the biogas. In addition to the powered device component damage resulting from siloxane decomposition, downstream catalytic scrubbers for removal of noxious products such as carbon monoxide or formaldehyde can also be harmed by siloxane exposure. Catalytic deactivation by siloxanes results in lower conversion efficiency and hastens field aging of affected reactors.

To ameliorate the effects of siloxane compounds in biogas, adsorbent scrubber systems, which typically include granulated activated carbon (GAC), are used upstream of biogas powered devices to remove siloxanes from the biogas stream. Significant cost is incurred for virgin and regenerated GAC material. Because upstream siloxane concentration can vary, it may be difficult to predict GAC useful life from historical measurements or first principle calculations. If the GAC is replaced too soon, the material cost is higher than necessary. If the GAC is changed too late (after siloxane breakthrough has occurred), expensive maintenance may be needed for the heat and power engines.

Conventionally, siloxane content in biogas is sampled using gas bags or adsorption tubes, which are then sent to an external laboratory for analysis using gas chromatography-mass spectroscopy (GC-MS). Sampling locations include upstream and/or downstream of the GAC bed. The disadvantages of off-line analysis include delays on the order of days between sampling and analysis, as well as cost incurred for repeated analytical testing. The use of an FTIR spectrometer for on-line siloxane measurements has been proposed. The concentration of D5 and other siloxanes in biogas, as measured by on-line FTIR, was correlated, upstream and downstream of the GAC bed, with off-line GC-MS results. However, technical disadvantages of on-line FTIR analysis include interference from non-siloxane containing hydrocarbons and dependence on biogas background consistency. Operational disadvantages include the cost of the detector and ongoing maintenance of such analytical equipment.

Development of improved on-line siloxane concentration measurement devices is very desirable to, for example, maximize efficiency of a GAC bed (as well as other siloxane/contaminant composition filtering systems) and minimize operating costs. Indeed, advanced on-line sampling of siloxane concentration in biogas has been identified as a knowledge gap for utilization of renewable biofuels. In a related application, engines operating with raw biogas fuel without adsorbent scrubbers would be able to use siloxane exposure measurements from an on-line device to anticipate silicon dioxide buildup and proactively schedule maintenance.

SUMMARY

In one aspect, a sensor system for detecting mass deposition from a gaseous environment includes a first sensor element including a first electrically conductive heating component and a first interface structure on the first electrically conductive heating component. The sensor system further includes electronic circuitry in connection with the first electrically conductive heating component. The electronic circuitry is configured to provide energy to the first electrically conductive heating component to heat the first sensor element and to measure a thermodynamic response of the first sensor element, which varies with mass deposition of one or more compositions on the first interface structure. The thermodynamic response of the first sensor element may, for example, be measured by measuring an electrical property of the first electrically conductive heating component.

The sensor system further may, for example, include a second sensor element including a second electrically conductive heating component and a second interface structure on the second electrically conductive heating component. The electronic circuitry may, for example, be configured to operate the second sensor element as a compensating element for at least the first sensor element to compensate for ambient conditions. The second sensor element may, for example, be treated to be generally insensitive to at least one of the one or more compositions. The second sensor element may, for example, be treated with a predetermined amount of an oxidized organosilicon compound.

In a number of embodiments, the first interface structure is selected to adsorb at least one of the one or more compositions. The adsorbed at least one of the one or more compositions may, for example, oxidize upon heating.

In a number of embodiments, the first interface structure comprises an oxide. The first interface structure may, for example, include a silicon oxide or a metal oxide. The first interface structure may, for example, have a surface area of at least 75 $m^2/g$. In a number of embodiments, the first interface structure includes a refractory metal oxide. The first interface structure may, for example, include an oxide of aluminum, tin, zinc, copper, zirconium, titanium, silicon, cerium, or lanthanum.

In a number of embodiments, the first sensor element includes no metal catalyst. In a number of embodiments, the first sensor element consists essentially of the first electrically conductive heating component and the first interface structure, which consists essentially of an oxide.

In a number of embodiments, the first sensor element is low-thermal mass element and the second sensor element is a low-thermal mass element. Each of the first sensor element and the second sensor element may, for example, independently have a thermal time constant less than 8 seconds or less than 6 second. The first sensor element and the second sensor element may, for example, be a low-thermal-mass pelement.

In a number of embodiments, the electronic circuitry applies a pulse to the first sensor element in which energy to the first sensor element is increased or decreased to induce the thermodynamic response from the first sensor element.

A temperature of the second sensor element may, for example, be maintained below a temperature at which at least one or the one or more compositions is oxidized on the second interface structure. The temperature of the second sensor element may, for example, be maintained below 150° C. or below 90° C.

In a number of embodiments, the temperature of the first sensor element is increased via the pulse to induce joule heating and for sufficient time to raise the temperature of the first sensor element. In a number of embodiments, energy is decreased via the pulse from a temperature of at least a first temperature such that convective heat transfer between the first interface structure and surrounding gas ceases and for sufficient time so that the temperature of the first sensor element decreases below a temperature at which joule heating of the first sensor element occurs.

The electronic circuitry may, for example, be configured to apply a plurality of pulses to the first sensor element over time in which energy to the first sensor element is increased or decreased to induce the measured thermodynamic response from the first sensor element in each of the plurality of pulses. The electronic circuitry may further be configured to analyze one or more of the measured thermodynamic responses.

In another aspect, a method for detecting mass deposition from a gaseous environment includes providing a sensor system including a first sensor element having a first electrically conductive heating component and a first interface structure on the first electrically conductive heating component, providing electronic circuitry in connection with the first electrically conductive heating component, providing energy to the first electrically conductive heating component via the electronic circuitry to heat the first sensor element, and measuring a response of the first sensor via the electronic circuitry to determine if the first sensor element has been exposed to one or more compositions in the gaseous environment. The measured response of the first sensor element varies with an amount of the one or more compositions to which the sensor system has been exposed in the environment over time.

In another aspect, a system includes a device sensitive to mass deposition of one or more compositions from a gaseous environment surrounding the device, and a sensor system for detecting mass deposition from the gaseous environment. The sensor system includes a first sensor element having a first electrically conductive heating component and a first interface structure on the first electrically conductive heating component, and electronic circuitry in connection with the first electrically conductive heating component. The electronic circuitry is configured to provide energy to the first electrically conductive heating component to heat the first sensor element and to measure a thermodynamic response of the first sensor element, which varies with mass deposition of at least one of the one or more compositions on the first interface structure. The device sensitive to mass deposition of the one or more compositions may, for example, include a filter device.

The present devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 1A illustrates an embodiment of a sensor hereof including a sensing element and a compensating element.

FIG. 1B illustrates an enlarged view of the sensing element, pelement or detector of the sensor of FIG. 1A.

FIG. 1C illustrates an embodiment of the circuitry of the sensor for the sensor of FIG. 1A.

FIG. 1D illustrates another embodiment of circuitry for the sensor of FIG. 1A.

DETAILED DESCRIPTION

Figure 2A:
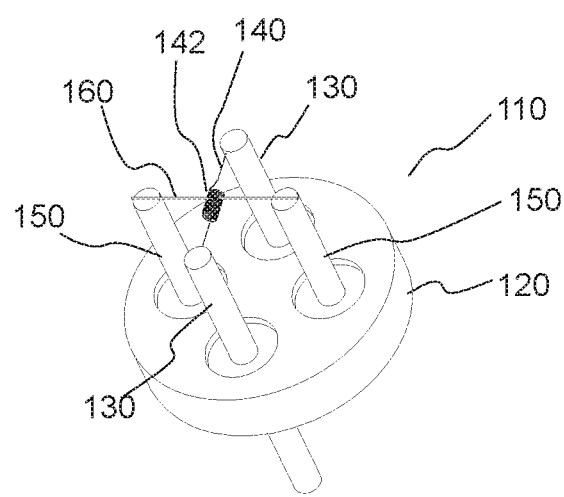
FIG. 2A illustrates a perspective view of an embodiment of a detector or sensor assembly wherein a sensing element is supported by a conductive supporting wire.

It will be readily understood that the components of embodiments hereof, as generally described and illustrated in the figures herein, may be arranged and designed in a wide variety of different configurations in addition to the described example embodiments. Thus, the following more detailed description of embodiments, as, for example, illustrated in the figures, is not intended to limit the scope of embodiments hereof, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a sensing element" includes a plurality of such sensing elements and equivalents thereof known to those skilled in the art, and so forth, and reference to "the sensing element" is a reference to one or more such sensing elements and equivalents thereof known to those skilled in the art, and so forth.

The terms "electronic circuitry", "circuitry" or "circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software.

The term "processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "controller," as used herein includes, but is not limited to, any circuit or device that coordinates and controls the operation of one or more input and/or output devices. A controller may, for example, include a device having one or more processors, microprocessors, or central processing units capable of being programmed to perform functions.

The term "logic," as used herein includes, but is not limited to. hardware, firmware, software or combinations thereof to perform a function(s) or an action(s), or to cause a function or action from another element or component. Based on a certain application or need, logic may, for example, include a software controlled microprocess, discrete logic such as an application specific integrated circuit (ASIC), or other programmed logic device. Logic may also be fully embodied as software. As used herein, the term "logic" is considered synonymous with the term "circuit."

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

In a number of embodiments, devices, system and methods hereof provide for rugged, economical detection of compositions/contaminants which may deposit upon a surface from a gaseous matrix or environment. For example, total volatile siloxane concentration in a gaseous matrix may be determined with minimal cross-interference. In the sensors hereof, changes in a thermodynamic response of a sensing element, resulting from mass loading or deposition of a composition thereon, are measured. The deposited mass alters the thermodynamic response of the sensing element to, for example, an energy change which may be created by voltage step change (when, for example, compared to the response of a sensing element upon which such mass has not been deposited). The change in the thermodynamic response upon deposition of the composition may, for example, be correlated to a gaseous/volatile dose (or exposure to a certain concentration over time) using information stored in a memory system and provided to a processor system.

"Mass deposition" sensing elements hereof may, for example, include a heating component or element (typically a conductive component or element) and an interface structure disposed on the heating component or element. Compositions or contaminants are deposited/adsorbed/chemisorbed upon the surface of the interface structure, and certain compositions (for example, sulfur compounds and silicon/organosilicon compounds) may become strongly bound thereto upon heating/reaction (for example, oxidation). In a number of embodiments, the interface structure includes an oxide, which may be a refractory or heat-resistant material (for example, a refractory metal oxide). In a number of embodiments, the interface structure has a surface area of at least 75 m$^2$/g, or a surface area of at least 150 m$^2$/g.

The mass deposition sensing elements hereof may, for example, be used in circuitry similar to that used for catalytic or combustible (flammable) gas sensors which have been in use for many years to, for example, prevent accidents caused by the explosion of combustible or flammable gases. A detailed discussion of combustible gas sensors and elements therefor is found in Mosely, P. T. and Tofield, B. C., ed., *Solid State Gas Sensors*, Adams Hilger Press, Bristol, England (1987). Combustible gas sensors are also discussed generally in Firth, J. G. et al., *Combustion and Flame* 21, 303 (1973) and in Cullis, C. F., and Firth, J. G., Eds., *Detection and Measurement of Hazardous Gases*, Heinemann, Exeter, 29 (1981). In such circuitry, a change in the thermodynamic response of an element is detectible via a change in an electrical property (for example, the electrical resistance) of a conductive heating element or component of the element. Unlike catalytic combustible gas sensor, electronic circuitry of devices and systems hereof is not operated in a manner to detect oxidation of combustible gas analytes in the sensor systems hereof. No gas undergoes catalytic oxidation in the sensors hereof.

Sensors hereof must sufficiently heat a sensor or sensing element through resistive heating. Such sensing elements include an electrically conductive heating element or heating component including, for example, a platinum alloy because of its large temperature coefficient of resistance and associated large signal in in the case of a change in the thermodynamic response of the sensing element. The electrically conductive heating element may, for example, be a helical coil of fine wire or a planar meander formed into a hotplate or other similar physical form. The sensing elements hereof further include an interface structure (for example, an oxide) disposed or formed on the electrically conductive heating element. One or more other materials (for example, one or more noble metals such as palladium, platinum, rhodium, silver, and the like or one or more base metals such as copper, nickel, cobalt, or vanadium, and the like) may be immobilized on the interface structure but need not. The interface structure may, for example, be formed of a refractory metal oxide including, for example, one or more oxides of aluminum, zirconium, titanium, silicon, cerium, copper, tin, lanthanum and the like. The interface structure may or may not have high surface area (for example, greater than or equal to 75 m$^2$/g). Precursors for the interface structure (and a noble or other metal) may, for example, be adhered to the heating element in one step or separate steps using, for example, thick film or ceramic slurry techniques. A metal salt precursor may, for example, be heated to decompose it to a desired dispersed active metal, metal alloy, and/or metal oxide.

A heating element such as a platinum heating element wire or coil may, for example, be encased in a refractory (for example, alumina) bead which may or may not be impregnated with a metal and/or other material. As described further below, the sensing elements hereof will react to phenomena other than mass deposition of target compositions thereon that can change the output thereof (that is, anything that changes the energy balance on the sensing element) and thereby create errors in the measurement of mass deposition of one or more compositions of interest. Among such phenomena are changes in ambient temperature, humidity, and pressure.

To minimize the impact of secondary effects on sensor output, the output of the sensing element may, for example, be measured in terms of the variation in resistance of the sensing element relative to a reference resistance embodied in, for example, a substantially inactive or inactive, compensating element. The two resistances may, for example, be part of a measurement circuit such as a Wheatstone bridge circuit or a simulated Wheatstone bridge. The output or the voltage developed across the bridge circuit or simulated bridge circuity when one or more deposited compositions is/are present provides a measure of the deposited mass. The characteristics of compensating element may, for example, be matched as closely as possible with the sensing element. In a number of embodiments, the compensating element may, however, be substantially inactivated or inactivate to mass deposition as described further below. In general, changes in properties of the compensating elements caused by changing ambient conditions are used to adjust or compensate for similar changes in the sensing or sensor element.

Using a thermally matched temperature compensating element or compensator for determination of deposition of a mass of a composition in sensors hereof may thus provide an improved signal-to-noise ratio. An improved signal-to-noise ratio may be particularly advantageous in the case of the relatively small signals generated in determining thermodynamic changes resulting from, for example, mass changes arising from dosages in relatively low ppm-hour ranges. Sensors hereof may, for example, detect mass deposition for composition dosages (concentration per unit time) of 10 ppm-hr or greater, or 5 ppm-hr or greater. During field operation of sensors in a number of embodiments, a temperature measured by, for example, a temperature transducer of the sensor may reference the appropriate bridge coefficients to obtain specified mass deposition detection performance. In a number of embodiments, the sensing element(s) and temperature compensation element(s)/pelement(s) therefor may be positioned in similar but separate thermal environments As described above, compositions, materials or contaminants detected by the sensor hereof may be introduced to sensitive equipment via the surrounding environment thereof. Such compositions are likewise deposited upon the surface of a sensing element hereof from the environment. If the sensing element (or a surface of a system/device being monitored) is heated to a certain temperature, many such materials react (for example, oxidize—either partially or completely) upon the surface of the element. Such reaction may result in a species that is more strongly bound to the surface. While some such compositions may "burn off" over time or at higher temperatures (for example, oxidation products of sulfur compounds), other compositions become permanently bound upon oxidation (for example, oxidation products of silicon compounds). It has historically been difficult to detect mass depositing contaminant materials, inhibiting materials and/or poisoning materials in an environment. Composition which may be detected by the devices and systems hereof include, but are not limited to sulfur-containing compounds, volatile silicon/organosilicon compounds. lead compounds, organophosphate compounds and halogenated compounds/hydrocarbons.

An organosilicon vapor such as hexamethyldisiloxane (HMDS) will indiscriminately diffuse into a device or system and its surroundings, adsorb onto the surface of the device or system, and oxidize into a layer of silica (silicon dioxide or $SiO_2$) or $Si_xC_yO_z$ species upon sufficiently heated surfaces. Organosilicon vapors are known to, for example, interfere with the operation of gas sensors, interfere with powered device components, contaminate cleanroom processes etc. Mass deposition or contamination sensor hereof may, for example, be incorporated in a combustible gas sensor or other gas sensor systems as described in copending U.S. patent application Ser. No. 16/437,487, filed Jun. 11, 2019, to provide an indication of the operational status of one or more combustible gas analyte sensing elements of the combustible gas sensor system.

In the case of a sensor hereof as illustrated in FIGS. 1A through 1D, a heating element such as heating element 20 of FIG. 1B (for example, a conductive wire, coil or surface) is used to raise an interface structure 30 of the element (including the interface structure) to a predetermined temperature as discussed further below. As used herein with respect to an element hereof, temperature refers to an average temperature over the volume of the element. The elements of the sensors hereof may be similar in manufacture to combustible gas sensor heating element, but no metal catalyst is required to catalyze any reaction. Heating elements or components may, for example, be made from coils as described above. Relatively small diameter conductive heating elements or wires may be used used to reduce the power consumption of the element. As illustrated in FIG. 1A, a mass deposition sensing element 40 hereof may be combined with a compensating element 50 in a system 10 hereof. Mass deposition sensing element 40 and compensation element 50 may be combined in, for example, a Wheatstone bridge circuit as illustrated in FIG. 1C or a simulated bridge circuit as illustrated in FIG. 1D. The simulated bridge circuit of FIG. 1D may, for example, require less energy that the Wheatstone bridge circuit of FIG. 1C.

During the application of low voltages (for example, 0V-0.25V), to a heating element wire or coil such as coil 20 (that is, a heating element or component), the element resistance remains consistent. In such a voltage range, resistive changes are predominantly governed by ambient temperature fluctuations. The principles employed in this regime are well known and are used, for example, in resistive thermometers. In that regard, the platinum resistance thermometer is a versatile instrument for temperature measurement in the range from approximately −200° C. to +1000° C. One may, for example, use the simplified Callendar-Van Dusen equation to determine the temperature dependent resistance as follows:

$$R_t = R_0[1+\alpha(t-t_0)]$$

wherein $R_t$ is the resistance of the element at temperature t, $R_0$ is the resistance at a standard temperature $t_0$, and $\alpha$ is the temperature coefficient of resistance. The above principle has, for example, been used as described in U.S. Pat. No. 8,826,721, the disclosure of which is incorporated herein by reference, to operate an element of a combustible gas sensor (which may be a catalytically active sensing element or a catalytically inactive element) in a low power (voltage), low-temperature mode in which element is able to function as a compensating element or compensator.

The application of higher voltages (for example, >0.5V) will cause the heating element or component to increase in temperature, and thus in resistance. This effect is known as Joule's first law or the Joule-Lenz law. Joule heating, also known as ohmic heating or resistive heating, is the process by which the passage of an electric current through a conductor releases heat. In the case of, for example, a mass deposition sensing element hereof including an interface structure, the heat transfer from the heating element/component will eventually reach an equilibrium as the heat will conduct from the heating element to the interface structure overlaying the heating element (including, for example, an oxide or refractory material) and then via fluidic convection through the surrounding gases. Thermal equilibrium will remain balanced until (a) the ambient temperature changes; (b) the makeup of the surrounding gas mixture is altered, or (c) the transfer of heat between the wire and the mass of the element changes (as a result of a mass or density change). These effects are all competing and interacting effects.

The use of conductive elements or components such as wires having relatively small diameter in an element is, for example, disclosed in U.S. Pat. No. 8,826,721 and U.S. Patent Application Publication No. 2018/0128763, the disclosure of which is incorporated herein by reference. Similar elements may be used in the sensors hereof. However, larger or conventional pelements may be used in the sensors hereof.

Figure 2B:
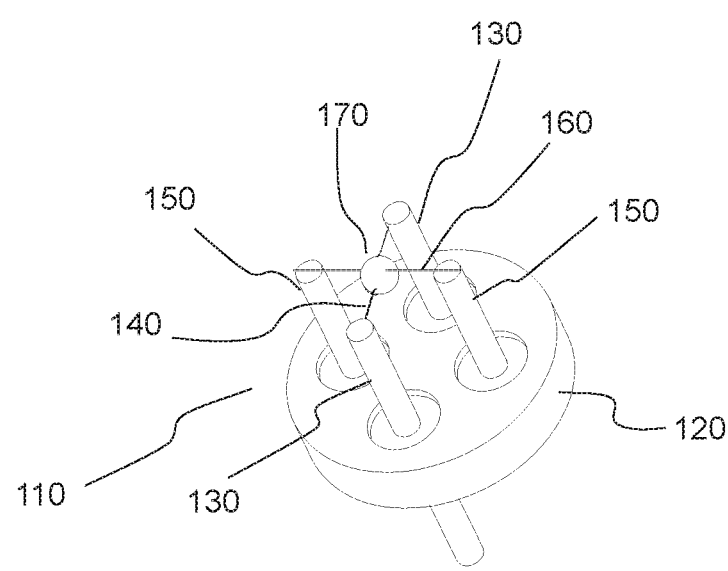
FIG. 2B illustrates a perspective view of the detector or sensor assembly of FIG. 2A including a ceramic bead formed over the sensing element wire.
Figure 2C:
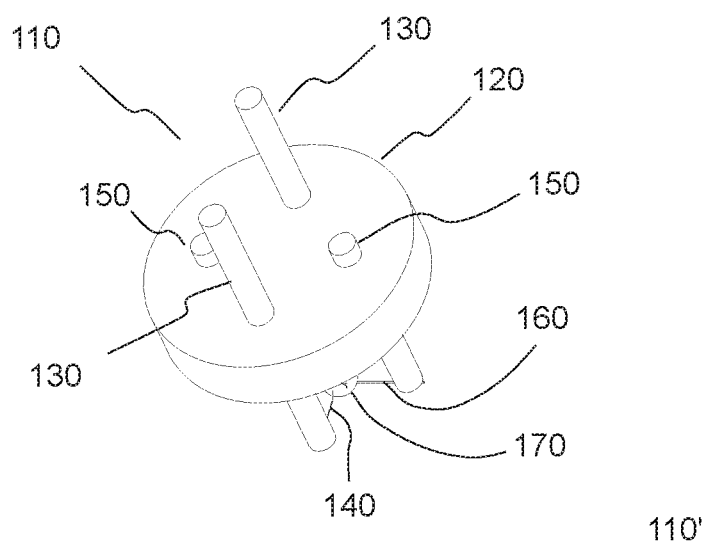
FIG. 2C illustrates another perspective view (generally opposite that of FIG. 2B) of the detector or sensor assembly of FIG. 2A.

FIGS. 2A through 2C illustrate a representative embodiment of a detector/element assembly 110 which may, for example, be used in a sensor hereof. Element assembly 110 includes a base 120 to which two electrically conductive contact members 130 (extending members or posts in the illustrated embodiment) are attached. A sensing conductive element or heating element 140 is connected between contact members 130, wherein each end of conductive elements 140 is connected to or anchored to one of contact members 130. In the illustrated embodiment, conductive element 140 includes an intermediate section including a coiled section 142 that can, for example, be located approximately centrally between the ends of conductive element 140. Wires and/or other conductive elements for heating elements or components are selected to have a favorable temperature coefficient for sensing applications and are generally a precious metal or alloy.

Element assembly 110 further includes two support members 150 (extending members or posts in the illustrated embodiment) connected to base 120. In the illustrated embodiment, a support member or element 160 in the form of, for example, a wire, a ribbon, a rod or other suitable support structure or material extends between support members or posts 150. Base 120, contact members 130 and support members 150 can, for example, be formed of a metal such as KOVAR® (a nickel-cobalt ferrous alloy designed to be compatible with the thermal expansion characteristics of borosilicate glass) available from Carpenter Technology Corporation of Reading, Pa. Contact members 130 and support members 150 can, for example, be sealed to base 120 using a glass such as borosilicate glass to provide electrical isolation.

Using a strong yet relatively thin support element 160 anchored, connected or attached at each end thereof (for example, anchored at two support members or posts 150) prevents bead movement in all three dimensions while limiting heat loss. In the illustrated embodiment of FIGS. 2A through 2C, support element 160 passes through and contacts one of the coils of coiled section 142. Contact between support element 150 and conductive element 140 is thus minimal. As described below, support element 150 need not contact conductive element 140 to provide support therefor but can contact or pass through interface structure 170 encompassing conductive element 140. Alloys of tungsten, nickel, molybdenum or titanium with, for example, platinum, palladium or rhodium can, for example, be used in support element 160.

As illustrated in FIG. 2B, interface structure 170 (for example, a ceramic bead in a number of embodiments) can be formed on coil section 120 of sensing conductive element 140. In forming interface structure 170 as a refractory material such as a ceramic, an aluminum oxide suspension may, for example, be fired onto coiled section 142. The resultant interface structure or ceramic bead 170 may provide increased surface area and adsorption sites for one or more compositions or species to be deposited thereon.

The support assembly, including, for example, support member 150 and support element 160, enables the use of a sensing element 140 having a relatively small average diameter. For example, a wiring having an average diameter no greater than approximately 20 µm of 10 µm may be used. Such a small average diameter wire (with a corresponding higher per unit length resistance than larger diameter wires) lends itself well to reducing the required operating current (which is very desirable in portable or remote applications), and thus the required power levels. In a number of embodiments, the interface structures hereof have a volume less than $6.5 \times 10^7$ µm$^3$, less than $4.46 \times 10^7$ µm$^3$), or even than $1.4 \times 10^7$ µm$^3$).

As known in the art, a heating element in the form of a wire or wire coil may be dipped it into a colloidal dispersion of a precursor of a refractory. The precursor may then be converted into the refractory material by heating (for example, by the passage of an electrical heating current through the heating element). The dipping process is usually repeated to build up an interface structure of the desired size/average diameter around the heating element.

Low thermal time constants associated with low thermal mass sensors such as the low-thermal-mass pelements described above assist in providing quick response times and decrease power requirements. Low-thermal-mass elements hereof may, for example, have a thermal time constant of 8 second or less, 6 seconds or less, 1 second or less, 0.5 seconds or less or 0.250 second or less. A low thermal mass/low thermal time constant sensor may, for example, be a pelement of low thermal mass as described above or a microelectronic mechanical systems (MEMS) element to provide a thermal time constant. As used herein the thermal time constant of an element is defined as the time required to change 63.2% of the total difference between its initial and final temperature when subjected to a step function change in drive power, under zero power initial conditions. MEMS elements typically have a lower thermal time constant than low-thermal-mass pelements. MEMS elements may, for example, have thermal time constants of 1 second or less, 0.5 seconds or less or 0.250 second or less.

In combustible gas sensors, oxidation catalysts formed onto a helical wire heater as described above are typically referred to as pelements, while those formed onto hotplates (whether MEMS hotplates or conventional, larger hotplates) are sometimes known by the substrate. Oxidative catalysts formed on MEMS heating elements are sometimes referred to as MEMS pellistors. As used herein, the term "MEMS pellistor" or "MEMS element" refers to a sensor component with dimensions less than 1 mm that is manufactured via microfabrication techniques. As described above, no catalyst need be included in the MEMS elements. In a number of representative embodiments, sensing elements formed as MEMS pellistors hereof may be manufactured via thick film fabrication techniques and powered to an operating temperature by resistive heating. In a number of representative embodiments, the thickness and diameter for a MEMS sensing film is approximately 15 microns and approximately 650 microns, respectively.

Figure 3A:
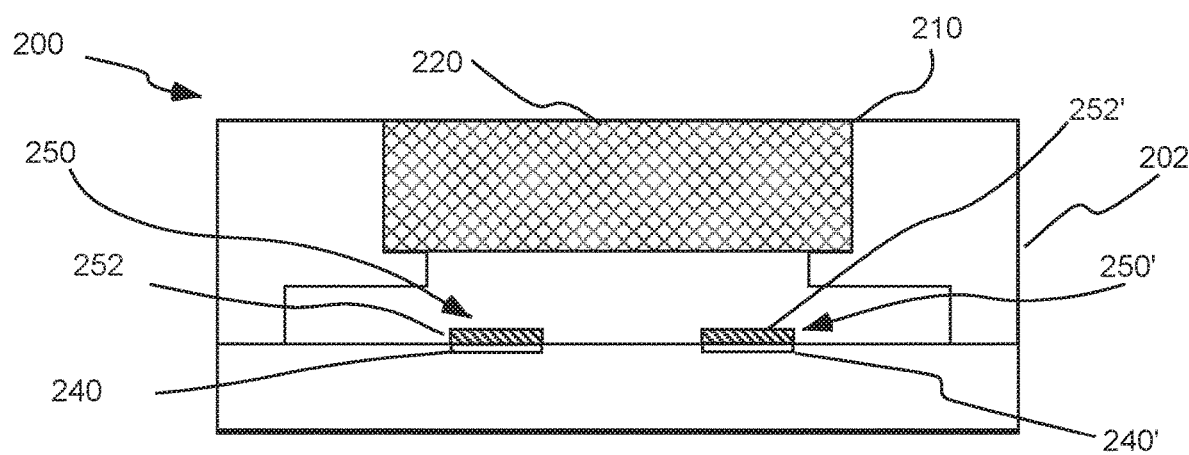
FIG. 3A illustrates schematically a cross-sectional view of an embodiment of a low-thermal mass, MEMS hotplate sensor suitable for use herein.
Figure 3B:
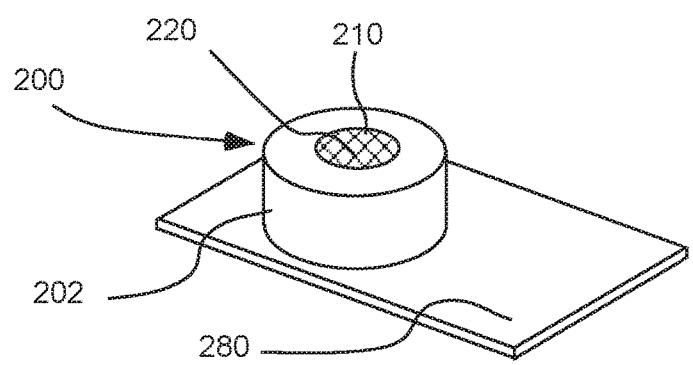
FIG. 3B illustrates a perspective view of the low-thermal-mass MEMS sensor of FIG. 3A in operative connection with a printed circuit board.

FIG. 3A illustrates a cutaway view of an embodiment of a MEMS or micro-hotplate sensor 200 hereof, which includes a housing 202 having a gas inlet 210. A screen or cap 220, which may include or function as a filter 230, may, for example, be placed in connection with inlet 210. One or more heating elements or hotplates 240 may, for example, be used to heat an interface layer or structure 252 of a first MEMS element or pellistor 250 to a first operating temperature. In a number of embodiments, a second MEMS element or second pellistor 250' may be included within MEMS hotplate sensor 200. In a number of embodiments, first MEMS element 250 may be operated as a sensing or detecting element and second MEMS element 250' may be operated as a compensating element as known in the combustible gas sensor arts.

In the case of combustible gas sensors, compensating elements typically include a deactivated catalyst layer or other deactivation layer which destroys the activity of the compensating element to oxidize combustible analyte gases. Such inactive compensating elements are typically operated at the same temperature of the analyte element. As described in U.S. Pat. No. 8,826,721, the operation of a particular element as a sensing element or a compensating element may be controlled by controlling the operating temperature thereof. In the case of a combustible gas sensor, if the operating temperature of an element is maintained at or above a temperature at which gas will combust at the surface thereof, it may be operated as a sensing element. If the operating temperature of an element is maintained below a temperature at which gas will combust at the surface thereof, it may be operated as a compensating element. The temperature at which gas will combust at the surface of an element depends upon the composition of that surface. Surfaces including a catalytic material will typically cause combustion at a temperature (a catalytic light-off temperature) lower than a surface not including a catalytic material. Compensating elements of sensors hereof may likewise be operated at a lower temperature than the sensing elements in some embodiments. In other embodiments, a deactivated compensating element (as described further below) may be operated with the same temperature profile as the sensing element.

MEMS hotplate sensor 200 may, for example, mounted on a printed circuit board or PCB 280. The two resistances of the element 250 and element 250' may, for example, be part of a measurement circuit such as a Wheatstone bridge circuit as illustrated in FIG. 1C or a simulated Wheatstone bridge circuit as illustrated in FIG. 1D. A representative example of a MEMS hotplate sensor suitable for use herein is an SGX MP7217 hotplate sensor or pellistor available from SGX Sensortech, SA of Corcelles-Coromondreche, Switzerland. Such a MEMS hotplate sensor is disclosed, for example, in U.S. Pat. No. 9,228,967, the disclosure of which is incorporated herein by reference. MEMS technology, thin/thick film system technology, or other suitable micro- or nanotechnology may be used in forming low-thermal-mass elements for use herein. See, for example, U.S. Pat. Nos. 5,599,584 and/or 6,705,152, the disclosures of which are incorporate herein by reference.

The sensing elements hereof may be operated in either a comparative/continuous mode or in a dynamic mode. The amount or mass of a composition deposited upon a sensing element hereof may be relatable to, or correlated with, an amount or dosage (that is, exposure of a certain concentration over a certain period of time—for example, in the units of ppm-hour) of one or more compositions to which a sensor hereof is exposed over time.

In a number of representative embodiments, comparative methods or measurements are used in determining deposition of one or more compositions upon a sensing element. One skilled in the art appreciates that a number of different variables related to or relatable to a change in thermal properties of a sensing element hereof associated with a change in mass of the element may be used. Changes in one or more such variables are, for example, related to or indicative of a change in mass resulting from the presence of a deposited mass of a composition on the interface structure of the sensing element. In a number of embodiments, changes in an electrical property (for example, resistance) of a conductive heating element of a sensing element associated with changes in the thermal properties of the sensing element are monitored. A variable such as voltage, current or resistance may, for example, be measured depending upon the manner in which the electrical circuitry of a sensor or instrument hereof is controlled. For example, voltage or current in an electronic circuit can be measured and related to a change in resistance of a contaminant sensing element. Alternatively, electronic circuitry of a sensor may be driven to maintain resistance of the contaminant sensing element relatively constant and a voltage or a current may be measured.

In the case of a comparative or continuous mode of operation, an element may, for example, be operated at a generally constant voltage, a constant current or a constant resistance (and thereby at a constant temperature) as described above during a particular mode of operation. To operate in a constant voltage, a constant current or a constant resistance mode, closed loop control is used.

In an open-loop control methodology wherein temperature varies over the interrogation period, one may use a variety of dynamic, pulsed, or modulated operations the devices, systems and methods hereof. In a "dynamic-mode" or "dynamic interrogation mode" operational mode hereof, an element is, for example, briefly energized or de-energized via a change in the electric current flowing therethrough. The length of time of such dynamic interrogation pulses or changes may, for example, be very short in the case of low-thermal-mass elements and longer in the case of an element with higher thermal mass. Once again, the elements hereof may (but need not) have a low thermal mass as described above. During an individual energy change or pulse, an element hereof transitions through different thermal states as the temperature thereof changes over time. In a number of embodiments hereof, an interrogation method may be based on the observation of the non-linear electrical response in the electronic circuitry hereof, of which an interface structure of an element is a part, as the non-linear thermodynamic action in the element transitions from one thermal state (and temperature) to another. An interface structure that has a mass of a deposited composition thereon will exhibit a measurably different thermodynamic response to a change in energy supplied thereto because of the different thermal properties resulting from the additional mass. In a number of embodiments, interrogations are based on the measurement of dynamic action of a thermally transitioning structure and the associated electrical signals of the corresponding conductive heating element, which stands in contrast to other interrogation methods rooted in static analysis of steady-state signals. A dynamic interrogation pulse (in which applied energy is increased or decreased over a defined period of time) may be applied to an element that is otherwise operating in a continuous mode, wherein energy/temperature is maintained relative constant in one or more modes thereof, or in pulse-mode or pulse width modulation operation as described below. Like other interrogations methods hereof, dynamic interrogation measurements may be carried out in the ambient atmosphere (for example, air). Dynamic interrogation measurements may, for example, be more sensitive to deposition of compositions than steady-state or comparative measurements.

A dynamic-mode baseline response may first be established when there is high confidence that the element or elements have not been contaminated (for example, at the time of manufacture) by deposition of a mass of any composition. A device may subsequently be placed in the dynamic-mode interrogation as described above to determine if deposition of a composition has occurred. One or more threshold values may, for example, be established for slope of the curve, area under the curve, or values at one or more times along the curve. Once again, such interrogations may, for example, occur periodically over time. The control system of the sensor systems hereof may automatically initiate such a dynamic-mode interrogation on a periodic or other basis. Moreover, a dynamic-mode interrogation may also be initiated manually.

In the case of dynamic mode interrogation, using an element having a relatively low thermal time constant enables decreasing or minimizing the length of the dynamic mode interrogation and the power used therein as compared to an element having a higher thermal time constant. As described above, the first sensing element may (but need not) have a thermal time constant of 8 second or less, 6 seconds or less, 1 second or less, 500 msec or less, or 250 msec or less. MEMS element typically have lower thermal time constants than low-thermal-mass pelements.

The nature of the stimulus or interrogation pulse of energy, from an electrical standpoint, may be a step function or a controlled ramp or curve from one level to another and (optionally) back again in either direction applied to one or more interface structures of contaminant sensing elements hereof in one or more circuits simultaneously. The purpose of the pulse or brief energy change is to cause the changes in the thermodynamic properties of the interface system (arising from mass changes associated with mass deposition thereon) to be revealed as it heats or cools. Because the structure is part of sensitive electronic circuitry (via the conductive heating element), for example, including a Wheatstone bridge, simulated Wheatstone bridge or other bridge/simulated bridge configuration, the electrical properties of the electronic circuitry are changed in ways that are measurably different depending on the thermodynamic response of the element(s) to the stimulus pulse. These differences can then be analyzed leading to determinations that can be made about the physical condition of the structure.

Pulse width modulation may, for example, be used to control the energy delivered to elements hereof. Pulse width modulation is a well-known control technique used to control the average power and/or energy delivered to a load. In embodiments hereof, a voltage is supplied to heat an element to a desired temperature. Because the elements hereof may have relatively low thermal mass, the cycle times can be relatively short.

In pulse width modulation, heating energy (that is, heating voltage(s) or heating currents(s)) may be periodically supplied to the heating element(s) during an "ON time". Rest energy (that is, rest voltage(s) or rest current(s)), which is less than the heating energy may be supplied during a "REST time". The total of the higher-energy or ON time plus the lower-energy or REST time correspond to a cycle time or a cycle duration. The heating energy (voltages/currents)

supplied during the ON time may be constant during the ON time or may be varied (for example, supplied as heating voltage/current plateau or as heating voltage/current ramp). The rest energy (voltages/currents) may be equal to zero or be sufficiently lower than the heating energy so that the gas sensor does not consume any gas or substantially any gas to be detected. Similar to the ON time, the rest energy supplied during the REST time may be constant during all the REST time or may be varied (for example, supplied as rest voltage/current plateau or as rest voltage/current ramp). The cycle may be repeated.

An advantage to operating in pulse mode is significantly lower power consumption as compared to a continuously powered mode. Another advantage is improved span response as a result of adsorption of excess combustible gas on the interface structure at cooler temperatures during unpowered or lower powered operation (that is, during the REST time) as compared to continuously powering the element at a run temperature.

Figure 4:
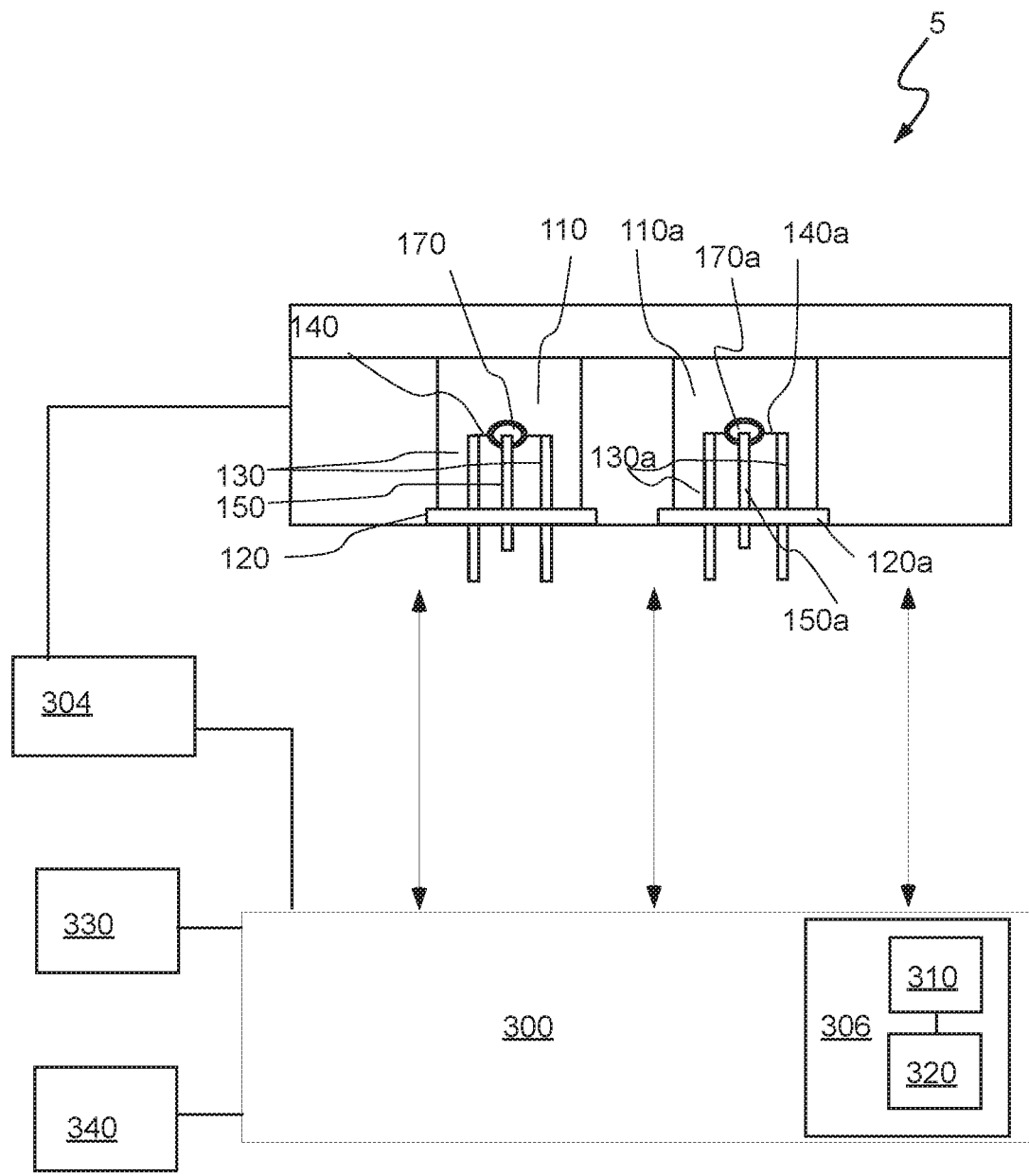
FIG. 4 illustrates schematically a sensor device or instrument including two detector or sensor assemblies as illustrated in FIGS. 2A through 2C for detection of a composition deposited upon the sensing element thereof in electrical connection with control and measurement circuitry.

FIG. 4 sets forth a schematic illustration of another representative embodiment of a sensor system hereof. In the embodiment of FIG. 4, a sensor device, instrument or system 5 includes two elements or element/detector assemblies 110 (a first element/pelement, as described in connection with FIGS. 2A through 2C) and 110a (a second element/pelement as described in connection with FIGS. 2A through 2C) to form a sensor hereof. In FIG. 4, components of second element 110a are numbered similarly to like components of first element 110, with addition of the designation "a" thereto). First element 110 and second element 110a are incorporated within or connected to electronic circuitry 300 (for example, via or as part of a Wheatstone bridge or simulated Wheatstone bridge) to measure a thermodynamic response of first element 110 (a sensing element) resulting from mass deposition of one or more compositions thereon. In certain embodiments, at any time, one of elements 110 and 110a operates as an analyte element and the other of elements 110 and 110a operates as a compensating element as a function of temperature control. The sensing element may be operated in a higher power/higher temperature mode and compensating element may be operated in a lower power/lower temperature mode of operation. In most embodiments however, one of elements 110 and 110a includes a deactivation layer as described further below and is operated solely as a compensating element. In that regard, dedicated compensating element may include a deactivation layer (for example, a layer of an oxidized silicon-containing composition) which destroys its ability to adsorb/detect further mass of one or more compositions. In such a case, one of elements 110 and 110a is always operated as a sensing element, while the other of elements 110 and 110a is always operated as a compensating element.

Sensing element 110 may (but need not), for example, include a metal (for example, a noble metal or base metal catalyst, an inactivated metal catalyst, or other composition) supported thereof. Interface structure 170 need only be functional or operational to adsorb a composition to be detected thereon and undergo measurable changes in thermodynamic response properties as a result thereof.

Electronic circuitry 300 may be, for example, placed in electrical connection with contact posts 130, 130a of each of assemblies 110 and 110a via a printed circuit board or PCB (not shown in FIG. 4). A power source 304 provides power to electronic circuitry 300. In the case of a sensor fixed at a position within a facility, power may be provided from a remote source or from one or more local batteries. In the case of a portable sensor system, power source 304 may include one or more batteries. Electronic circuitry of sensor system 5 may also include a control system 306 which may, for example, include control circuitry and/or one or more processors 310 (for example, a microprocessor) and an associated memory system 320 (storing, for example, control, measurement/analysis, and/or other software or logic executable by processor(s) 310) in communicative connection with processor(s) 310. A user interface 330 (including, for example, audible, visual (for example, via a display) or tactile information transmission) to provide information to a user and via which a user may input information (for example, via a keyboard, touchscreen or other input device) and a communication system 340 (for example, including a wired and/or wireless data transceiver for remote information/data transmission) may also be provided.

In a number of studies, sensing element 110 was formed using manufacturing methodologies similar to that of catalytically active analyte detecting/sensing element of a combustible gas sensor to include a metal catalyst supported on interface structure 170. However, sensing element 110 as incorporated and operated in the system of FIG. 4 was inoperable to determine a concentration of a combustible gas analyte. Interface structure 170 was formed of a refractory composition including aluminum oxide, which was impregnated with a noble metal catalyst (for example noble metals such as palladium, platinum, rhodium, silver, and the like) or a base metal (for example copper, nickel, cobalt, or vanadium, and the like). In a number of representative studies, it was found that dynamic diagnostics on such a sensing element 110, when operated at a step voltage of 1.85 V, showed a change in response, compared to the uncontaminated sample, at a heating time of 200 ms into a step of −0.87 mV±0.62 mV (mean±standard deviation) for a dose of 44 ppm-hours hexamethyldisiloxane (HMDS). Alternately, the heating curves can be fit to splines, as known in the curve fitting arts, which can predict HMDS dose with an $R^2$ of 0.91. Additional or alternative data analytical methods known to those skilled in the art such as, for example, area under the heating curves, may be used to predict HMDS dose.

In a number of representative embodiments, a voltage step change of, for example, 2.5 seconds on, 10 seconds off, may be repeated several times and a later pulse (for example, the second pulse, the third pulse or a later pulse) is used for diagnosis. The third pulse was used in a number of embodiments hereof. In a number of studies, the period of time between composition exposure and dynamic diagnosis yielded similar correlations for time periods between 1 and 15 minutes.

In a number of studies, the material composition of sensing element 110 was varied by excluding metals (noble metals as well as base metals or other compositions) from interface structure 170. Further, unlike the case of compensating elements, no inactivating treatments were applied to the refractory aluminum oxide of interface structure 170 of sensing element 110 hereof. Sensing element 110 in such studies thus included (or consisted essentially of or consisted of) heating element or component 140 (including helical coil section 142) covered in metal-oxide, ceramic interface structure 170. In a number of embodiments, a metal-oxide, ceramic interface structure 170 was formed of high surface area aluminum oxide. It was found that dynamic diagnostics on an oxide-only interface structure 170 of contaminant sensing element 110, when operated at a step voltage of 1.85 V, showed a change in response, compared to the uncontaminated sample, at a heating time of 200 ms into a step of −0.96 mV±0.25 mV for a dose of 44 ppm-hours HMDS.

Figure 5A:
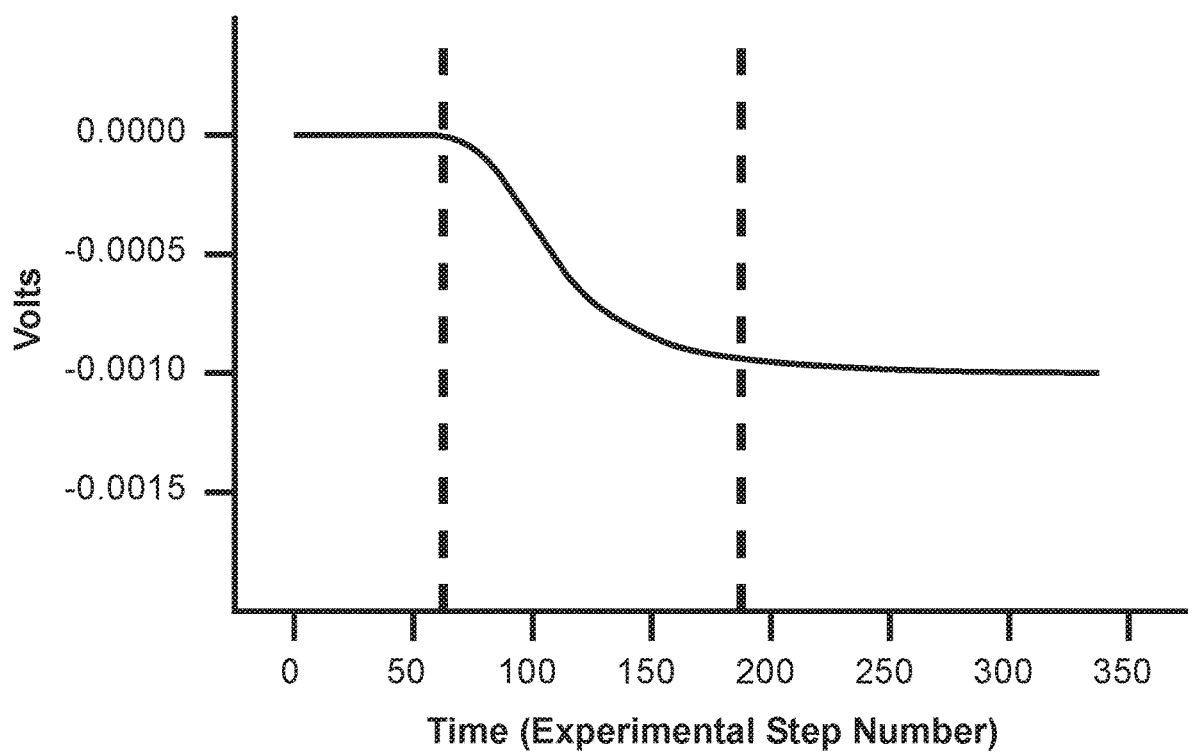
FIG. 5A illustrates change in the 200 ms dynamic response over the course of 44 ppm-h HMDS poisoning.
Figure 5B:
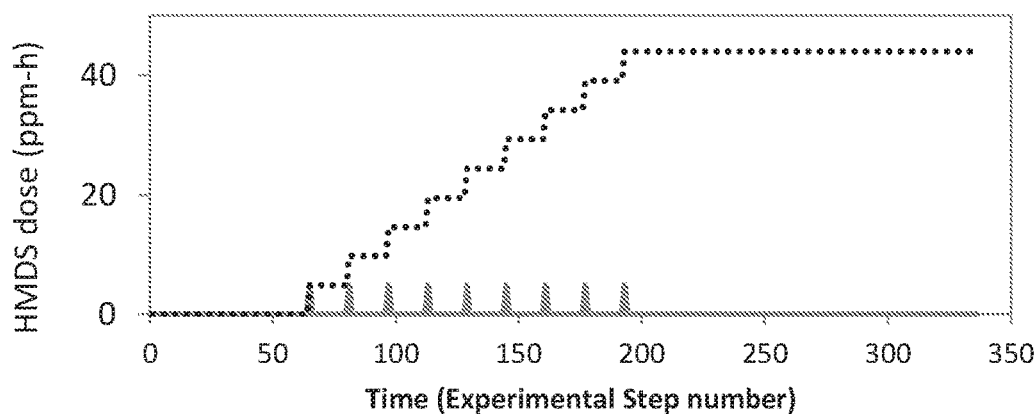
FIG. 5B illustrates the contaminant schedule for the experiment of FIG. 5A wherein the per step dose is shown by the solid line and the cumulative dose is shown by the dotted line.
Figure 6:
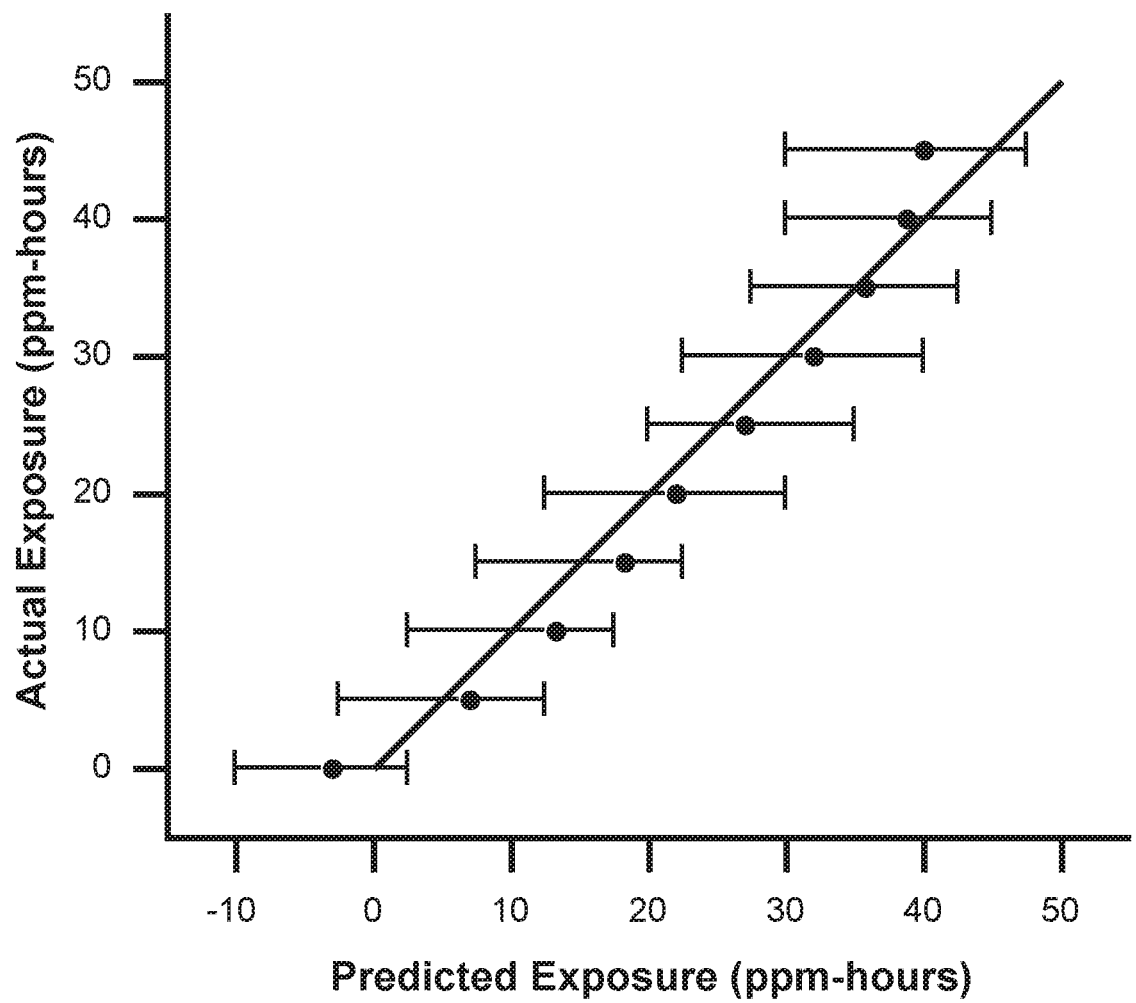
FIG. 6 illustrates predicted HMDS exposure using a balanced model with spline coefficient fits, with actual measured exposure shown on the ordinate.

Data for such studies are set forth in FIGS. 5A and 5B. Alternately, the heating curves may be fit to splines which can predict HMDS dose with an $R^2$ of 0.94, as illustrated in FIG. 6. As described above, additional or alternative data analytical methods known to those skilled in the art such as, for example, area under the heating curves, can be used to predict HMDS dose.

As also described above, a voltage step change of, for example, 2.5 seconds on, 10 seconds off, may be repeated several times and a later (for example, the second, the third or a later pulse) may be used for contaminant level diagnosis. Once again, the third pulse was used in a number of studies hereof. The time between poison exposure and dynamic diagnosis yielded similar correlations for times between 1 and 15 minutes. Lower power operation was investigated by lowering the voltage setpoint on oxide-only sensing elements 110. Lower power operation (achieved, for example, by lowering the voltage setpoint on the elements) is possible to conserve energy. The operational power was not optimized in the experimental studies of the systems hereof, but such optimization is readily achievable for a particular system using known engineering principles. An oxide-only contaminant sensing element 110 (that is, without a metal or other composition supported thereof) was selected for further study because of its superior statistical predictive power as compared to use of a standardly produced catalytically active combustible gas analyte sensing element (including a supported noble metal catalyst) as sensing element 110.

For the measured response from the sensing element to be used to predict or determine, for example, a "contamination" dose of one or more compositions to which another device or system has been exposed, it must sufficiently sample the environmental dose and interact with the one or more compositions to undergo mass addition and, therefore, thermodynamic response. A number of sampling approaches are possible which may, for example, be varied dependent upon the operation of sensing element. It may be desirable in some embodiments (for example, in the case of compositions which react upon heating to bind to a surface) to, at least partially, match the temperature control of a sensing element hereof to one or more device/system components being monitored. However, it is possible (for example, via processing) to correlate sensing element response to device/system contamination doses when the analyte element is operated in a different temperature control scheme than the devices/systems being monitored.

Figure 7:
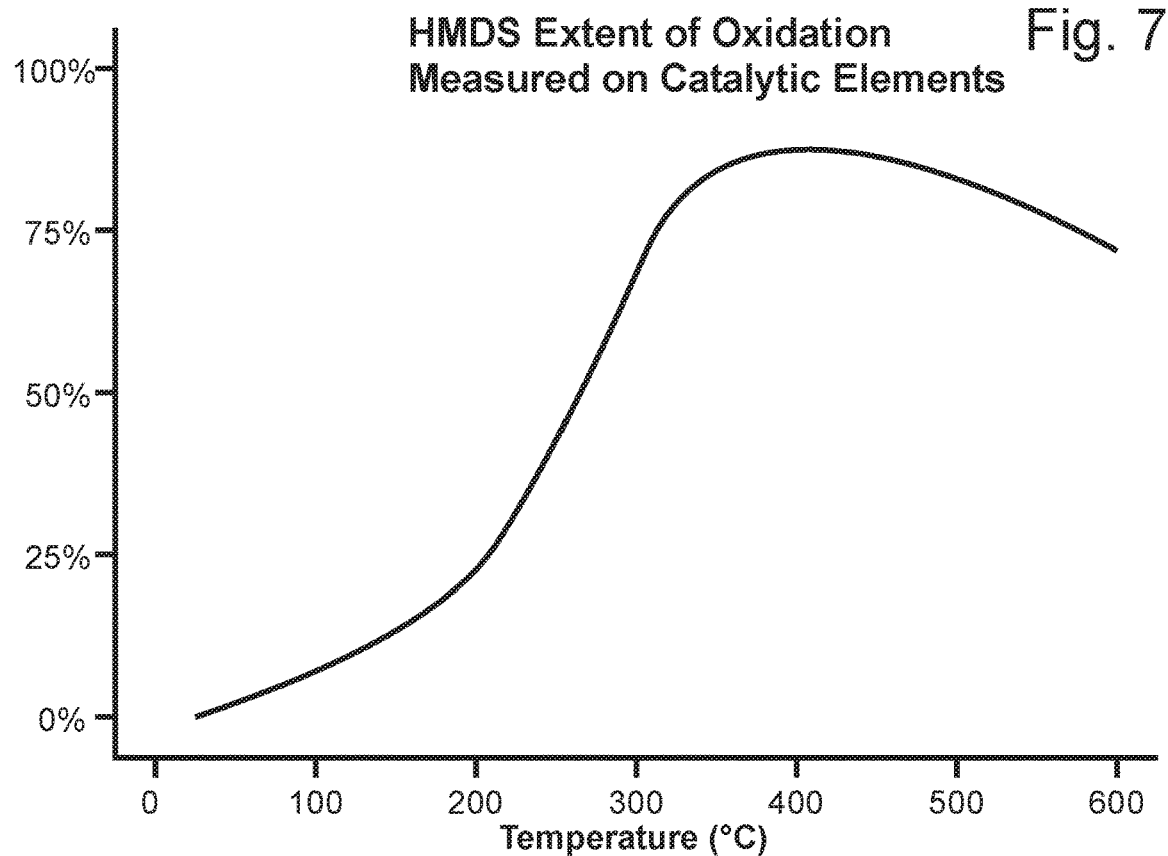
FIG. 7 illustrates a light-off curve for hexamethyldisiloxane (HMDS) as measured via sensitivity loss in methane of a catalytically active analyte sensing element in a combustible gas sensor as a function of exposure temperature in HMDS.

In one embodiment of a sampling approach, a sensing element may be operated continuously at an elevated temperature, in between diagnostic measurements (for example, dynamic diagnostic measurements). In an alternate sampling approach, enabling lower power operation compared to a continuous mode, one may reduce the temperature and/or run time of the sensing element. Those skilled in the art recognize that a minimum temperature may be required for oxidation of certain composition on the interface structure of the sensing element. Many poisons and/or inhibitors are oxidized on the surface of an element (for example, on a support structure or interface structure hereof) at a certain minimum temperature, sometimes referred to as "light-off" temperature. In the representative example of siloxane vapor, oxidation of the siloxane vapor on the element occurs below the temperature required for combustible gas detection on a noble metal catalyst. HMDS is a common siloxane contaminant and has a relatively low light-off temperatures. The light-off temperature of HDMS is greater than 150° C. as illustrated in FIG. 7, but well below the light off temperature of hydrocarbons such as methane. Heating a contaminant sensing element hereof via Joule heating to a temperature below a light-off temperature in the case of a contaminant such as HDMS may result in desorption of the contaminant and any effect upon thermodynamic response of the element may not be measurable. Relatively quickly heating the contaminant sensing element to a temperature above the light-off temperature results in oxidation of the HDMS to a species tightly bound upon the interface structure. Another contaminant, with a different physiochemistry, may become sufficiently bound to the interface structure to affect the thermodynamic response thereof without oxidation or other reaction on the surface of the interface structure. However, sufficient energy for Joule heating is required to effect a change in the temperature of a contamination sensing element hereof so that changes in the thermodynamic response of the contamination sensing element may be detected. In general, any composition that deposits upon the interface structure of a sensing element hereof to increase the mass thereof in the Joule heating temperature range can be detected. Such compositions include, but are not limited to sulfur compounds, silicon/organosilicon compounds, lead compounds, organophosphate compounds and halogenated compounds.

Figure 8:
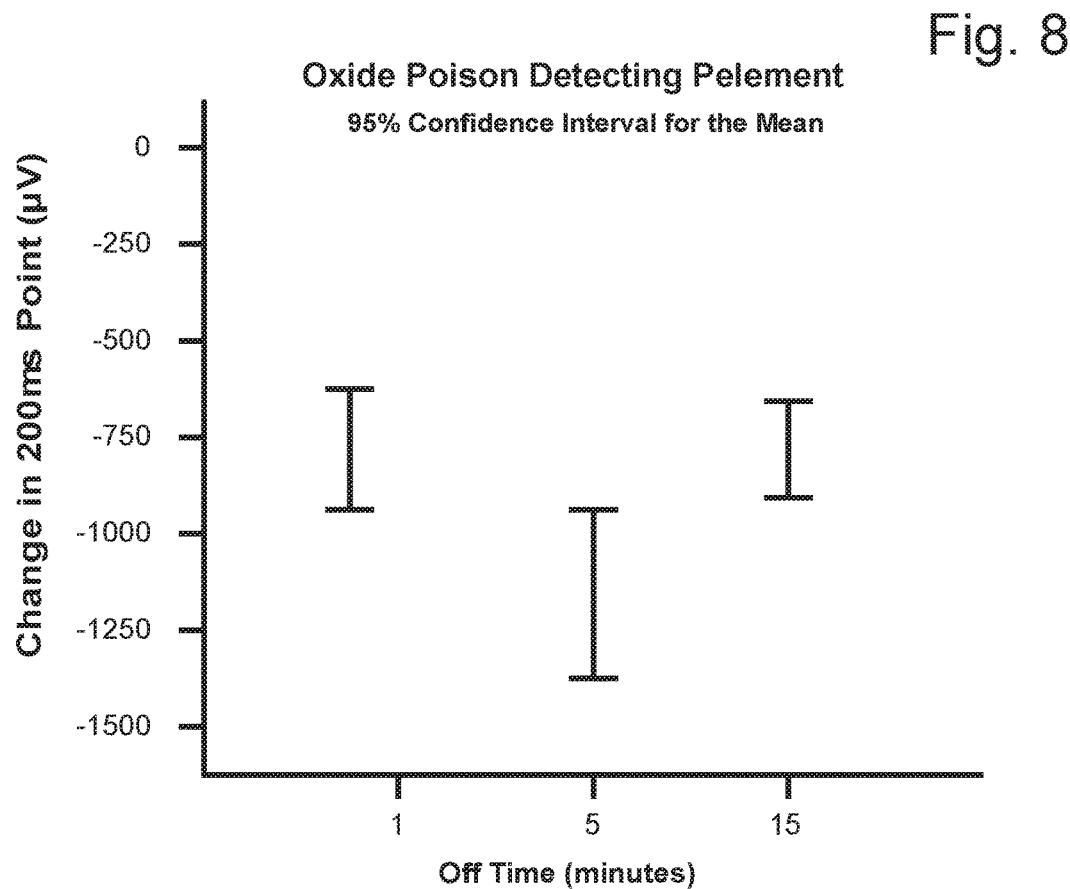
FIG. 8 illustrates response of a sensing element including an oxide interface structure to 50 ppm-hour HMDS as a function of a period of time the sensing element remains unpowered prior to application of a "loading pulse" thereto in the form of a pulse of energy.

With respect to run time of contaminant sensing elements hereof, studies of devices and systems hereof have shown that sampling the sensor vapor environment for, for example, virulent contaminants such as HDMS with the sensing element at a very low power over the course of 1-15 minutes is a sufficient temperature cycling rate (as, for example, illustrated in FIG. 8). Without limitation to any mechanism, it is hypothesized that cool operation of the sensing element, wherein sensing element is operated at very low power, allows adsorption/chemisorption sites (for example, oxide sites) of the interface structure of the sensing element to collect the one or more mass depositing composition under favorable adsorption properties (that is, at cool conditions). Under such cool conditions, the depositing composition (for example HMDS) is in a condensed or adsorbed/chemisorbed state but remains chemically unaltered. For certain compositions, when the sensing element is subsequently heated above the light-off temperature of the composition (which can occur relatively quickly for an element of lower thermal mass), the composition available on the oxide sites is reacted, generally oxidized, to a strongly held species. In the representative example of HDMS, silicon dioxide or a $Si_xC_yO_z$ species results upon heating. In a number of embodiments, the sensing element is heated to approximately 2.4 V for a single "loading pulse" with a duration of 1000 ms every 5 minutes. Approximately every four hours, the sensing element undergoes a dynamic diagnostic, which involves five pulses, preferably to 2.4 V, lasting 2500 ms each, 10 seconds apart. The power required for these two operations is about 1 mW, compared to a continuous operation power draw of 100 mW per element (pelement).

Temperature compensation for sensing elements hereof may, for example, be accomplished using a chemically deactivated or desensitized helical-wire compensator pelement 110a as disclosed in U.S. Pat. No. 5,401,470 which may, for example, be operated in the same dynamic (or comparative) diagnostic mode as the sensing element. It was discovered that loading a compensating element for a sensor hereof with, for example, a silicon or organosilicon compound such as HDMS rendered the thermodynamic response of such a compensating element substantially insensitive to further mass loading from a various compositions. In the case of low-thermal-mass pelements as described above, a dose of approximately 25,000 ppm-h was used to reduce the sensitivity or the compensating element to mass deposition of contaminants.

Because mass deposition of an organosilicon compound such as HDMS is destructive of the sensitivity of contaminant elements hereof, a specific contaminant element cannot be readily calibrated via exposure thereof to a particular dose of HDMS. By careful manufacture of contaminant elements hereof, one contaminant element can be exposed to HDMS to determine a calibration for other, like contaminant elements manufactured in the same manner. Alternatively, a contaminant/composition which does not form an irreversible bond with the interface structure may be used to calibrate a specific contaminant element that may later be used in a contaminant sensor hereof. In that regard, after the calibration, the removable contaminant may be removed from the contaminant element. For example, a sulfur compound may be used to calibrate a particular contaminant element and subsequently "burned off" that contaminant element at high temperature.

Once again, although certain advantages may be achieved using elements having low volume/low thermal mass as described above, the devices, systems and methods described above may also be used with element of relative high volume/high thermal mass. For example, standard pelements, which may have an effective diameter of greater than or equal to 1 mm may be used herein. Larger, higher-thermal-mass elements or pelements, which typically need no support wire such as support 160, may, for example, be appropriate for permanent or fixed applications. Use of larger pelements may, for example, provide for improved signal and/or greater sensor life.

In the case of operation of a sensing element hereof to detect mass deposition of one or more compositions, additional information may be obtained by examining the response in the different phases of heating as described above. In that regard, the greatest effect from contamination may occur during the peak conductive heating phase with measurably less or no effect in the trailing convective phase. This result indicates that the interface structure underwent physical changes in its internal structures. For example, this occurs when a sulfur-containing contaminant reversibly adsorbs onto the structure. If such an adsorbate has been identified, one may attempt a higher-temperature heating period to desorb the deposited composition(s) from the element and return the element to its original sensitivity.

Additional consideration may also be given to the convective phases of the interrogation pulses. If significant displacement has occurred in the trailing convective phase it may indicate that a contaminant material is deposited (for example, oxidized) on the outside of the interface structure, thereby changing the convective heat transfer characteristics. As additional mass deposition occurs, the change in signal continues to progress and may be represented in many measurable forms. Such a result is observed in the case of silicon-containing compositions such as HDMS which cannot be removed via high-temperature heating. Thus, examining different regions of the response curve to a dynamic energy change may provide additional information regarding the nature of the contamination and determine future actions to be taken.

Figure 9:
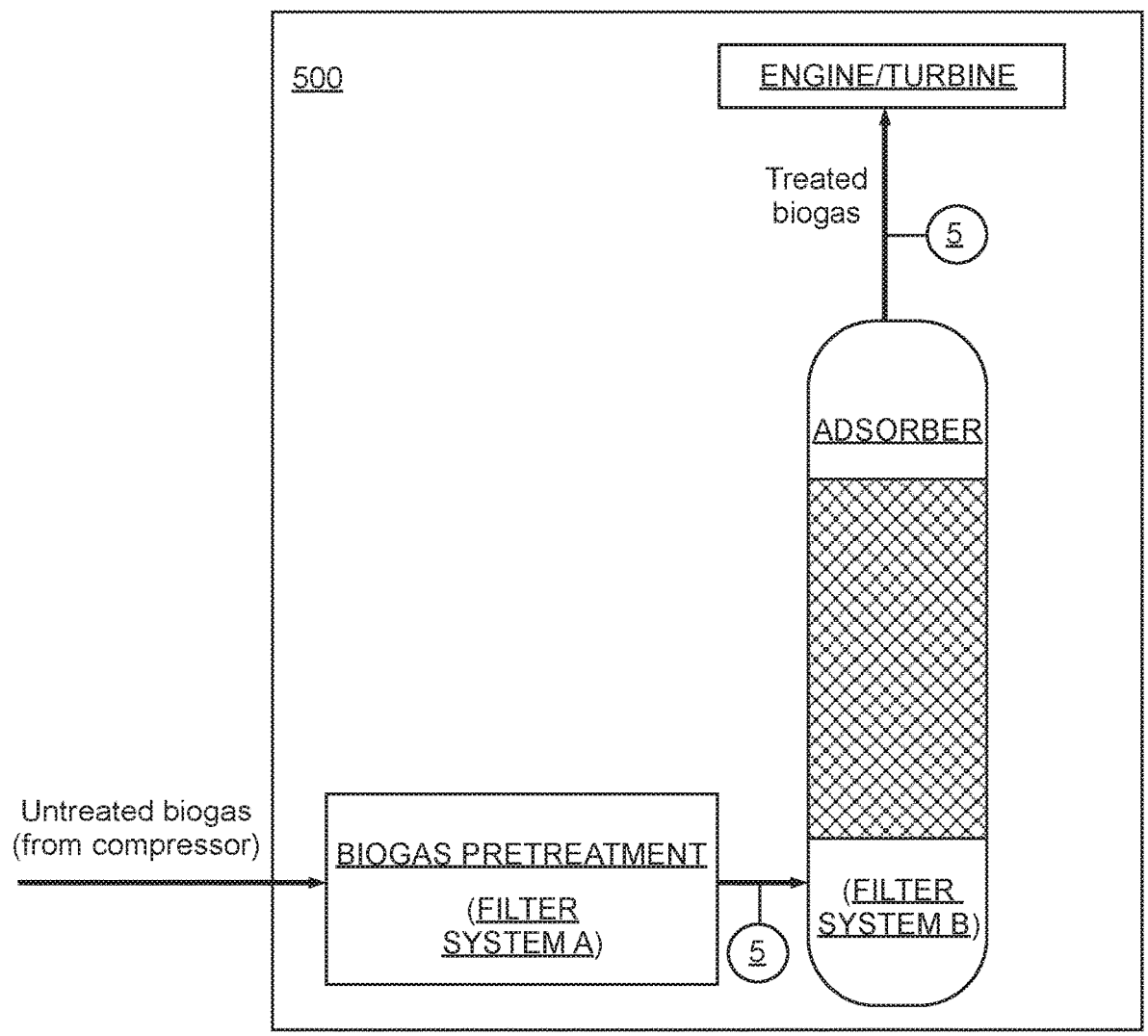
FIG. 9 illustrates schematically a biogas system including one or more sensor systems hereof to, for example, detect siloxane contamination.

FIG. 9 schematically illustrates a representative biogas process wherein untreated biogas is provided to a system 500 from, for example, a compressor (not shown). One or more filtering processes may be provided to removes siloxanes as well as sulfur-containing compounds from the raw biogas fees. In FIG. 9, two filter systems A and B are illustrated. Filter system A may, for example, be a pretreatment system such as a refrigeration condensation unit, which is intended to decrease siloxane levels. Second filter system B may, for example, be an adsorption unit such as a GAC unit designed to further decrease siloxane concentration (for example, to trace amounts). Treated biogas leaving filter system B is transported to, for example, an internal combustion engine, a turbine, a fuel cell and/or other device to be powered by the biogas. It should be noted that siloxane concentration for turbines and fuel cells may be considerably lower than for internal combustion engines.

A sensor device or system such as sensor system 5 hereof may be used in one or more places along the biogas transport path to, for example, provide siloxane measurements in real time. For example, a sensor system 5 hereof may be placed in fluid connection with the outlet of first filter system A. A measure of the level of siloxane in biogas exiting first filter system A provides a measure of the functionality of that system, as well as a measure of siloxane in the biogas entering filter system B (for example, a GAC absorber). Another sensor system 5 hereof may be placed in fluid connection with the outlet of filter system B. Measurements from sensor system 5, when in fluid connection with the outlet of filter system B (either alone or in connection with measurement for filter system 5 in connection with the outlet of filter system A), may, for example, be used to determine if breakthrough of the adsorbent system of filter system A has occurred and/or if regeneration or replacement is required. The output of filter system A also provides a measure of the exposure over time or dosage of siloxane experience by the system powered by the biogas (for example, an engine, a turbine, a fuel cell etc.). Such a measure may, for example, be used to provide an alert to the need for maintenance associated with siloxane exposure.

Decomposition and/or polymerization of siloxane precursors under lean, that is, stoichiometrically oxygen deficient conditions, is possible in biogas conditions. The raw millivolt response of a sensor hereof to siloxanes under those conditions may, for example, be calibrated according to the background atmosphere. In a number of embodiments, the ratios of methane, carbon dioxide and/or oxygen ratios in the biogas being monitored by a sensor hereof may be determined with, for example, a conventional gas sensors, and the background information used by the processor of a sensor system hereof, which may determine an appropriate calibration curve (for example, via a look-up table or modeling equation) for determination of a siloxane response.

In other embodiments, a sensor hereof such as sensor system 5 may be plumbed with a fresh-air or a pure oxygen dilution factor to drive the lean oxidation of siloxane species on the sensing element. In such a case, the processor of the sensor system could increase the signal gain by the dilution factor. As siloxane sensor 5 hereof may also or alternatively be plumbed as a difference sensor, wherein matching elements may sample the upstream and downstream concentrations to determine adsorbent bed breakthrough (in other words to determine when the upstream and downstream concentrations equalize).

The devices, systems and methods here are useful for detecting mass deposition of one or more compositions from a gas/vapor phase in generally any environment, and the sensing element hereof may operate over a very wide temperature range (for example, from approximately 40 to 700° C.). Aspects of representative embodiments hereof are discussed above in connection with use of biogas for energy. Sensors hereof may also, for example, find use in printing processes, in cleanroom processes, and in many other processes. Sensors hereof are particularly useful for detection of silicon-containing and sulfur-containing compositions, but any composition which deposits upon a sensing element hereof and remains deposited during Joule heating may be detected as described herein.

The foregoing description and accompanying drawings set forth embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A sensor system for detecting mass deposition from a gaseous environment, comprising: a first sensor element comprising a first electrically conductive heating component and a first interface structure on the first electrically conductive heating component, a second sensor element, the second sensor element comprising a second electrically conductive heating component and a second interface structure on the second electrically conductive heating component, wherein the second sensor element is treated with a predetermined amount of an oxidized organosilicon compound, and electronic circuitry in connection with the first electrically conductive heating component and the second electrically conductive heating component, wherein the electronic circuitry is configured to provide energy to the first electrically conductive heating component to heat the first sensor element, to operate the second sensor element as a compensating element for at least the first sensor element to compensate for ambient conditions, and to measure a thermodynamic response of the first sensor element which varies with mass deposition of one or more compositions on the first interface structure via measuring an electrical property of the first electrically conductive heating component.

2. A sensor system for detecting mass deposition from a gaseous environment, comprising: a first sensor element consisting essentially of a first electrically conductive heating component and a first interface structure on the first electrically conductive heating component, the first sensor element comprising no metal catalyst, a second sensor element, the second sensor element comprising a second electrically conductive heating component and a second interface structure on the second electrically conductive heating component, and electronic circuitry in connection with the first electrically conductive heating component and the second electrically conductive heating component, wherein the electronic circuitry is configured to provide energy to the first electrically conductive heating component to heat the first sensor element, to operate the second sensor element as a compensating element for at least the first sensor element to compensate for ambient conditions, and to measure a thermodynamic response of the first sensor element which varies with mass deposition of one or more compositions on the first interface structure via measuring an electrical property of the first electrically conductive heating component.

3. The sensor system of claim 2 wherein the second sensor element is treated to be insensitive to at least one of the one or more compositions.

4. The system of claim 2 wherein the first interface structure is selected to adsorb at least one of the one or more compositions.

5. The system of claim 4 wherein the adsorbed at least one of the one or more compositions oxidizes upon heating.

6. The system of claim 2 wherein the first interface structure comprises an oxide.

7. The system of claim 6 wherein the first interface structure comprises a silicon oxide or a metal oxide.

8. The system of claim 2 wherein the first interface structure has a surface area of at least 75 $m^2/g$.

9. The system of claim 8 wherein the first interface structure comprises a refractory metal oxide.

10. The system of claim 8 wherein the first interface structure comprises an oxide of aluminum, tin, zinc, copper, zirconium, titanium, silicon, cerium, or lanthanum.

11. A sensor system for detecting mass deposition from a gaseous environment, comprising: a first sensor element comprising a first electrically conductive heating component and a first interface structure on the first electrically conductive heating component, the first electrically conductive heating component consisting essentially of an oxide, a second sensor element, the second sensor element comprising a second electrically conductive heating component and a second interface structure on the second electrically conductive heating component, and electronic circuitry in connection with the first electrically conductive heating component and the second electrically conductive heating component, wherein the electronic circuitry is configured to provide energy to the first electrically conductive heating component to heat the first sensor element, to operate the second sensor element as a compensating element for at least the first sensor element to compensate for ambient conditions, and to measure a thermodynamic response of the first sensor element which varies with mass deposition of one or more compositions on the first interface structure via measuring an electrical property of the first electrically conductive heating component.

12. The system of claim 11 wherein the first sensor element is a low-thermal mass element and the second sensor element is a low-thermal mass element.

13. The system of claim 12 wherein each of the first sensor element and the second sensor element independently has a thermal time constant less than 8 seconds.

14. The system of claim 12 wherein each of the first sensor element and the second sensor element independently has a thermal time constant less than 6 second.

15. The system of claim 14 wherein each of the first sensor element and the second sensor element is a low-thermal-mass pelement.

16. The system of claim 11 wherein the electronic circuitry applies a pulse to the first sensor element in which energy to the first sensor element is increased or decreased to induce the thermodynamic response from the first sensor element.

17. The system of claim 16 wherein a temperature of the second sensor element is maintained below a temperature at which at least one of the one or more compositions is oxidized on the second interface structure.

18. The system of claim 17 wherein the temperature of the second sensor element is maintained below 150° C.

19. The system of claim 17 wherein the temperature of the second sensor element is maintained below 90° C.

20. The system of claim 16 wherein the temperature of the first sensor element is increased via the pulse to induce joule heating and for sufficient time to raise the temperature of the first sensor element.

21. The system of claim 16 wherein the electronic circuitry is configured to apply a plurality of pulses to the first sensor element over time in which energy to the first sensor element is increased or decreased to induce the measured thermodynamic response from the first sensor element in each of the plurality of pulses, the electronic circuitry being configured to analyze one or more of the measured thermodynamic responses.

22. A sensor system for detecting mass deposition from a gaseous environment, comprising: a first sensor element comprising a first electrically conductive heating component and a first interface structure on the first electrically conductive heating component, a second sensor element, the second sensor element comprising a second electrically conductive heating component and a second interface structure on the second electrically conductive heating component, and electronic circuitry in connection with the first electrically conductive heating component and the second electrically conductive heating component, wherein the electronic circuitry is configured to provide energy to the first electrically conductive heating component to heat the first sensor element, to operate the second sensor element as a compensating element for at least the first sensor element to compensate for ambient conditions, and to measure a thermodynamic response of the first sensor element which varies with mass deposition of one or more compositions on the first interface structure via measuring an electrical property of the first electrically conductive heating component, wherein the electronic circuitry is configured to apply a pulse to the first sensor element in which energy is decreased via the pulse from a temperature of at least a first temperature such that convective heat transfer between the first interface structure and surrounding gas ceases and for sufficient time so that the temperature of the first sensor element decreases below a temperature at which joule heating of the first sensor element occurs.

* * * * *

UNITED STATES PATENT AND TRADEMARK OFFICE
CERTIFICATE OF CORRECTION

PATENT NO. : 11,268,923 B2
APPLICATION NO. : 16/437615
DATED : March 8, 2022
INVENTOR(S) : Meghan E. Swanson et al.

It is certified that error appears in the above-identified patent and that said Letters Patent is hereby corrected as shown below:

In the Drawings
Sheet 2/8, Figure 2C delete "110'".

In the Specification
Column 7, Line 34 delete "signal in in the case" and insert --signal in the case--.
Column 8, Line 59 delete "Composition" and insert --Compositions--.
Column 9, Line 58 delete "which element" and insert --which the element--.
Column 10, Line 60 delete "support element 150" and insert --support member 150--.
Column 11, Line 3 delete "120" and insert --142--.
Column 12, Line 43 delete "may, for example, mounted" and insert --may, for example, be mounted--.

Signed and Sealed this
Ninth Day of August, 2022

Katherine Kelly Vidal
*Director of the United States Patent and Trademark Office*